United States Patent [19]
Breazeale

[11] Patent Number: 5,123,799
[45] Date of Patent: Jun. 23, 1992

[54] TRAILER LOADING APPARATUS

[76] Inventor: Lloyd E. Breazeale, 4470 Nicolaus Rd., Lincoln, Calif. 95648

[21] Appl. No.: 723,765

[22] Filed: Jul. 1, 1991

[51] Int. Cl.$^5$ ............................................... B60P 3/10
[52] U.S. Cl. .................................. 414/462; 414/494; 414/538; 414/559
[58] Field of Search ............... 414/462, 469, 494, 537, 414/559, 538

[56] References Cited
U.S. PATENT DOCUMENTS

| | | | |
|---|---|---|---|
| 3,734,321 | 5/1973 | Long et al. | 414/462 |
| 3,840,133 | 10/1974 | Berg | 414/462 |
| 3,843,002 | 10/1974 | Pihlgren | 414/538 X |

Primary Examiner—Robert J. Spar
Assistant Examiner—Janice Krizek
Attorney, Agent, or Firm—Leon Gilden

[57] ABSTRACT

A vehicle including a support bed mounts a framework to include a winch assembly, wherein the winch assembly is operative through spaced pivot legs pivotally mounted to the support bed to direct a trailer positioned rearwardly from the framework in a first position to a second position mounted above the framework, with the framework supporting the trailer. The winch including a primary cable mounted to the trailer to project the trailer along a track directed medially of the framework, wherein the primary cable is withdrawn from the trailer in a subsequent operation and mounted to a pivot leg cable to thereafter pivot the trailer and pivot legs to position overlying the support framework when the trailer is securely mounted to the pivot legs.

4 Claims, 8 Drawing Sheets

FIG II

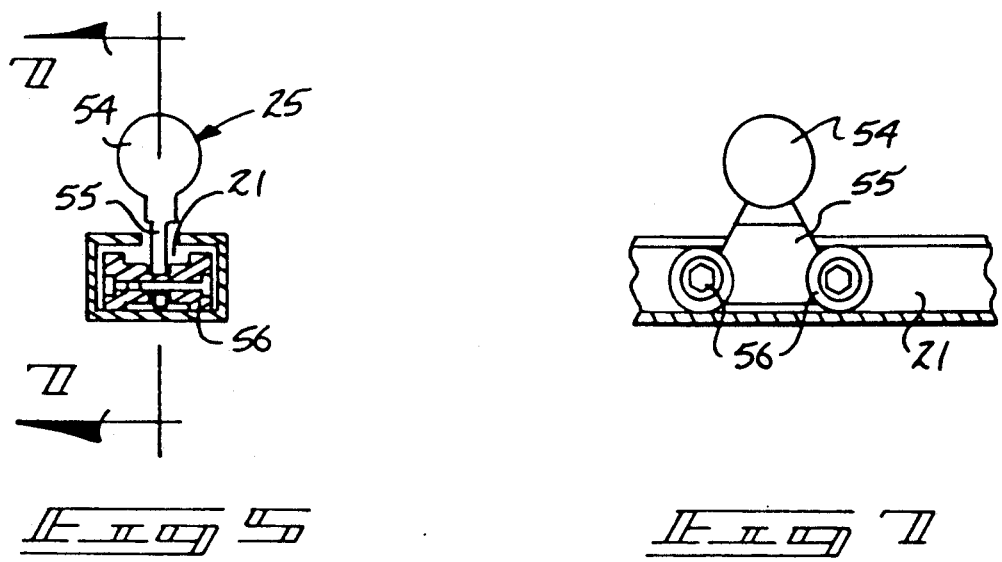
Fig 5
Fig 7
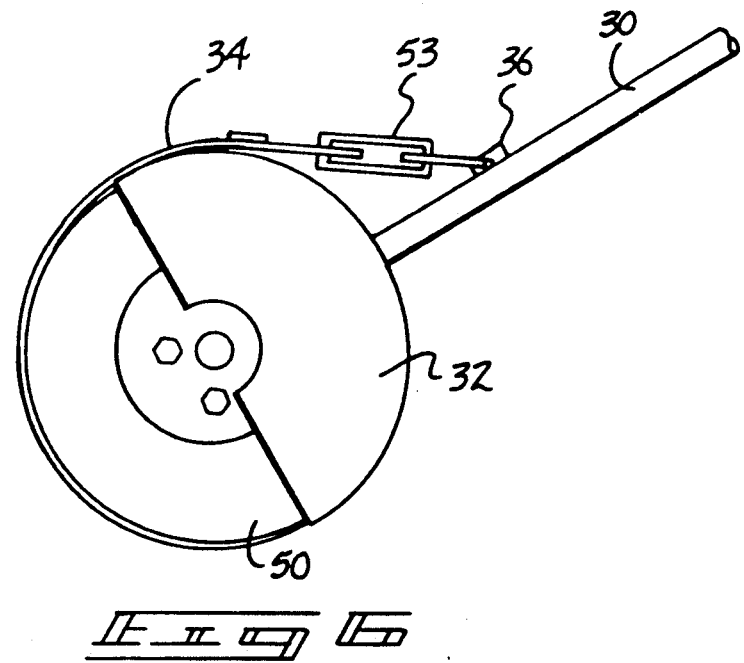
Fig 6

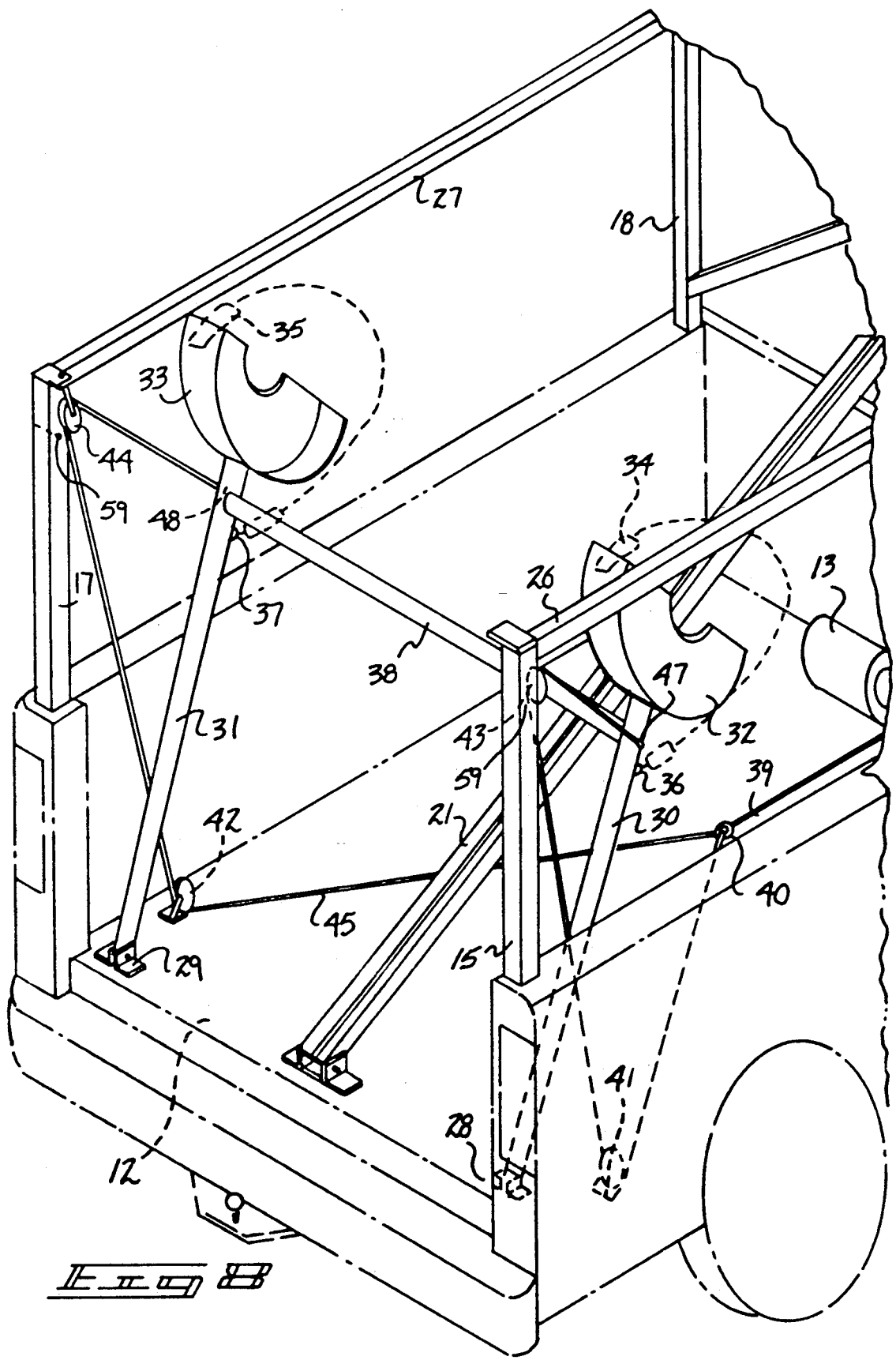

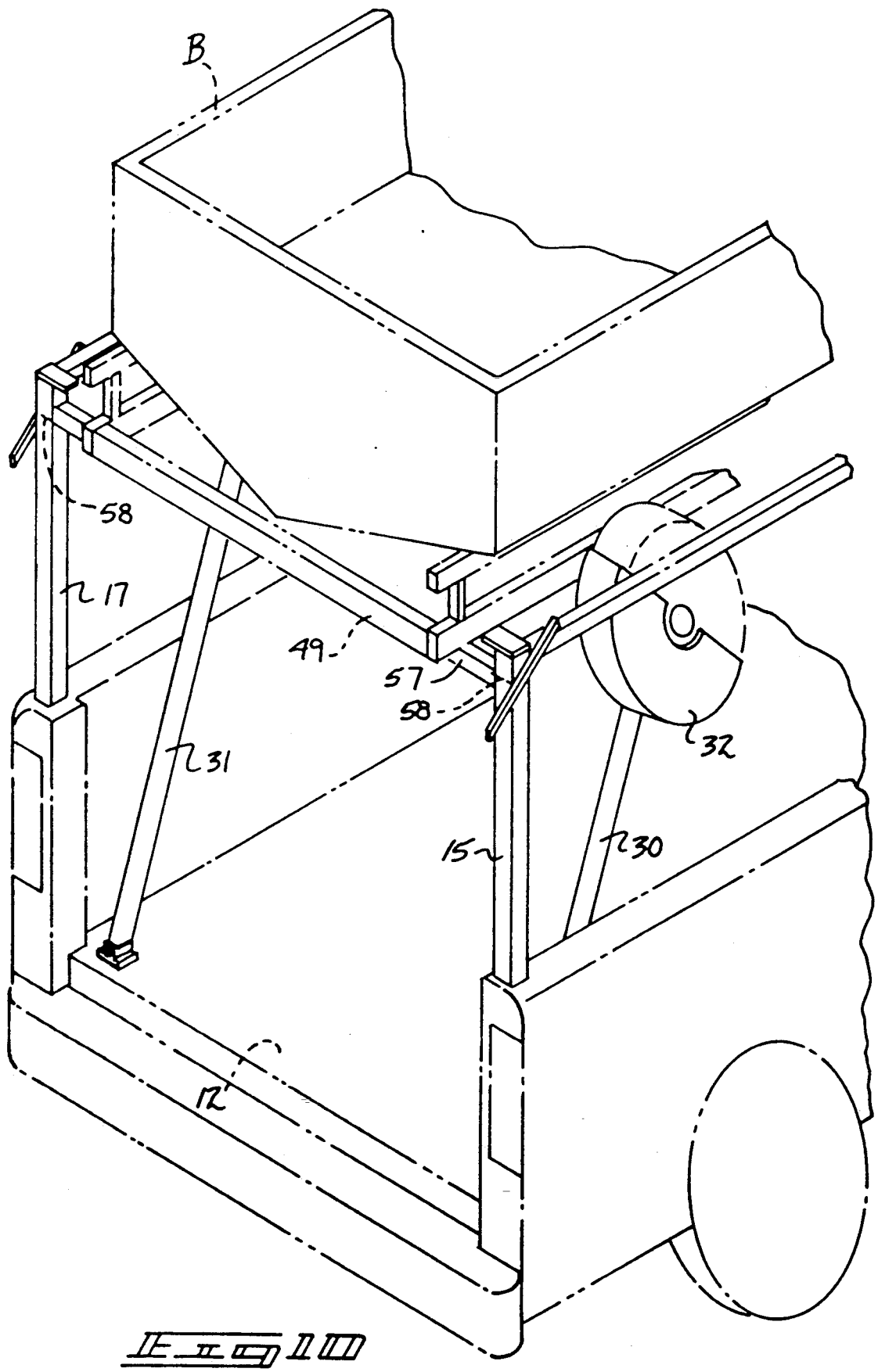

TRAILER LOADING APPARATUS

BACKGROUND OF THE INVENTION

1. Field of the Invention

The field of invention relates to loading apparatus, and more particularly pertains to a new and improved trailer loading apparatus wherein the same is directed to the loading and unloading of a trailer assembly relative to a framework on a support bed of a self-propelled vehicle.

2. Description of the Prior Art

The towing and storage of trailers during highway traverse is frequently awkward due to the extended orientation of the trailer relative to the towing vehicle. It is frequently desirable, if possible, to mount the trailer and an associated vehicle, such as boat and the like, to an overlying position relative to the self-propelled vehicle, but frequently due to relative size, it is not reasonably available to individuals in the prior art.

Prior art vehicle top loading trailers are exemplified in U.S. Pat. No. 4,058,243 to Tappan including a car top carrier that defines essentially a plurality of spaced tracks in parallel orientation relative to one another mounted to a roof portion of a vehicle.

U.S. Pat. No. 4,234,285 to Martinez sets forth a roof top carrier for a self-propelled vehicle utilizing a single framework that is pivotally mounted somewhat medially of itself relative to a roof portion of a vehicle.

U.S. Pat. No. 4,446,998 to Taig sets forth a support assembly for a vehicle wherein a mounting rack mounted to the roof of a vehicle includes a track portion pivotally mounted to the mounting rack.

U.S. Pat. No. 4,024,971 to Rohrer sets forth an equipment loader and unloader for a vehicle wherein a boat-type member is pivotally mounted for support on a roof portion of a vehicle. Similarly, U.S. Pat. No. 3,999,673 to Anderson sets forth a boat loader that is pivotally mounted and pulled upon a support of a vehicle by a cable and winch organization.

As such, it may be appreciated that there continues to be a need for a new and improved trailer loading apparatus as set forth by the instant invention which addresses both the problems of ease of use as well as effectiveness in construction in directing a boat trailer onto a support framework of an associated self-propelled vehicle support structure and in this respect, the present invention substantially fulfills this need.

SUMMARY OF THE INVENTION

In view of the foregoing disadvantages inherent in the known types of loading apparatus now present in the prior art, the present invention provides a trailer loading apparatus wherein the same is arranged to project a vehicle onto a trailer in a spaced relationship relative thereto. As such, the general purpose of the present invention, which will be described subsequently in greater detail, is to provide a new and improved trailer loading apparatus which has all the advantages of the prior art loading apparatus and none of the disadvantages.

To attain this, the present invention provides a vehicle including a support bed mounting a framework to include a winch assembly, wherein the winch assembly is operative through spaced pivot legs pivotally mounted to the support bed to direct a trailer positioned rearwardly from the framework in a first position to a second position mounted above the framework, with the framework supporting the trailer. The winch including a primary cable mounted to the trailer to project the trailer along a track directed medially of the framework, wherein the primary cable is withdrawn from the cable in a subsequent operation and mounted to a pivot leg cable to thereafter pivot the trailer and pivot legs to position overlying the support framework when the trailer is securely mounted to the pivot legs.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved trailer loading apparatus which has all the advantages of the prior art loading apparatus and none of the disadvantages.

It is another object of the present invention to provide a new and improved trailer loading apparatus which may be easily and efficiently manufactured and marketed.

It is a further object of the present invention to provide a new and improved trailer loading apparatus which is of a durable and reliable construction.

An even further object of the present invention is to provide a new and improved trailer loading apparatus which is susceptible of a low cost of manufacture with regard to both materials and labor, and which accordingly is then susceptible of low prices of sale to the consuming public, thereby making such trailer loading apparatus economically available to the buying public.

Still yet another object of the present invention is to provide a new and improved trailer loading apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an orthographic cross-sectional illustration of the guide track follower mounted within the associated guide track of the invention, taken along the lines 5—5 of FIG. 1 in the direction indicated by the arrows.

FIG. 6 is an orthographic side view of one of the pivot legs utilized by the invention in securement to an associated trailer wheel.

FIG. 7 is an orthographic view, taken along the lines 7—7 of FIG. 5 in the direction indicated by the arrows.

FIG. 8 is an isometric fragmentary view of the pivot legs in cooperation with the support framework.

FIG. 10 is an isometric fragmentary view of the support framework utilizing a rear support bar subsequently mounted to the support framework subsequent to mounting of the trailer to the support framework.

DESCRIPTION OF THE PREFERRED EMBODIMENT

Figure 1:
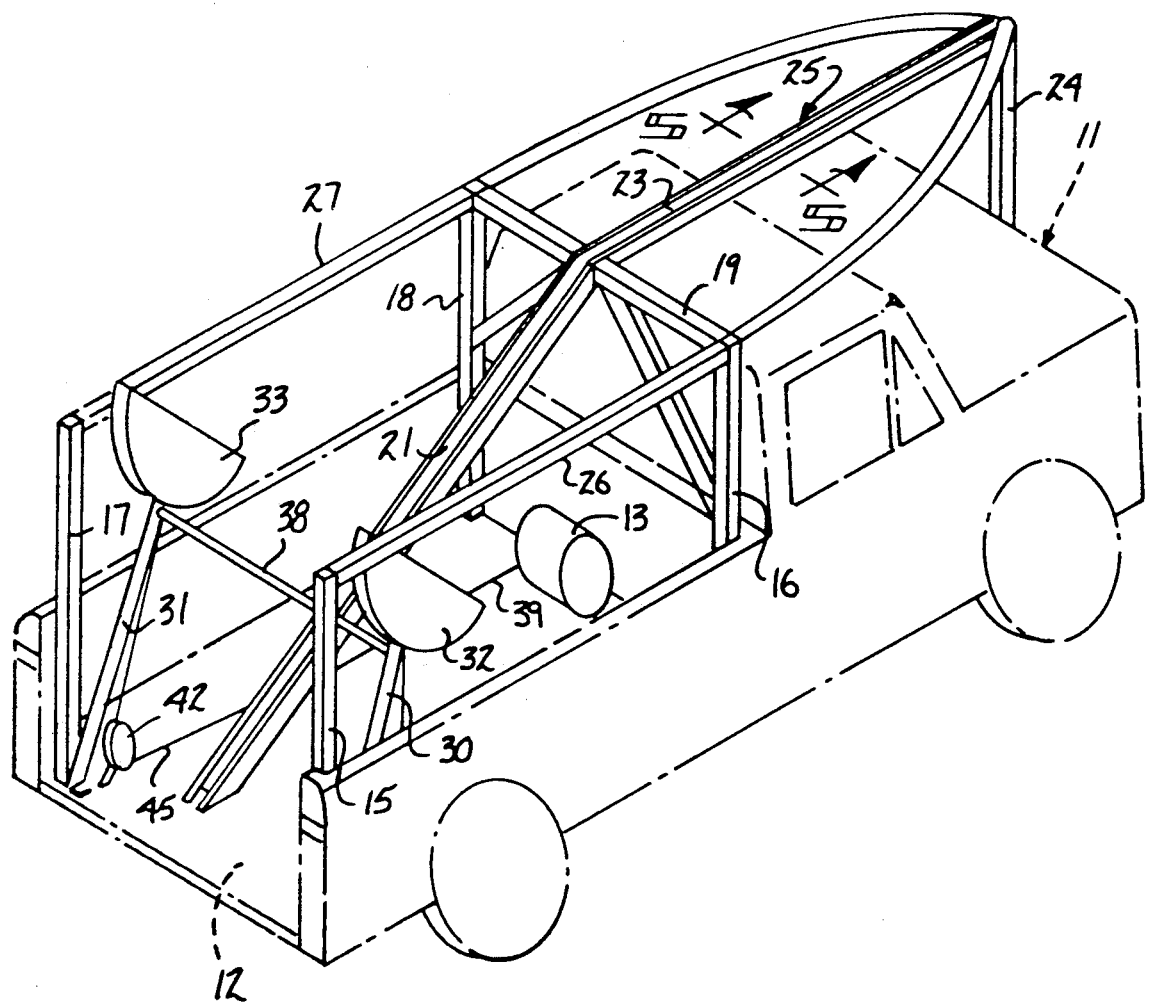
FIG. 1 is an isometric illustration of the support framework mounted to an associated self-propelled vehicle.

With reference now to the drawings, and in particular to FIGS. 1 to 10 thereof, a new and improved trailer loading apparatus embodying the principles and concepts of the present invention and generally designated by the reference numeral 10 will be described.

More specifically, the trailer loading apparatus 10 of the instant invention essentially comprises a self-propelled support vehicle 11, including a support bed 12. The support bed 12 includes a winch assembly 13 fixedly mounted to a forward end of the support bed 12, with the support framework including a rear right vertical support post 15 and a front right vertical support post 16 mounted in a parallel relationship relative to one another and orthogonally mounted to the support bed 12. A rear left vertical support post 17 and a front left vertical support post 18 are mounted parallel relative to one another and the right vertical support posts orthogonally mounted to the support bed 12, wherein the right and left vertical support posts are mounted in a spaced relationship on opposed sides of the support bed, as illustrated in FIG. 1. A horizontal connecting post 19 is orthogonally mounted to upper terminal ends of the front right and left vertical support posts 16 and 18. First guide rail 2 is mounted at its rear or lower terminal end to the support bed 12 adjacent a rear end of the support bed and projecting medially and longitudinally of the support bed but raised upwardly thereof connected medially of the horizontal connecting post 19 orthogonally oriented relative thereto. A second guide track 23 extends from the first guide track 21 forwardly of the vehicle and medially thereof in an orthogonal relationship relative to the horizontal connecting post 19, with the second guide track 23 fixedly mounted to a forward vertical post 24 mounted fixedly to a forward terminal end of the vehicle 11. A guide track follower 25 is rotatably and slidably mounted for movement along the first and second guide tracks 23 coextensively thereof, wherein with reference to FIG. 5 and FIG. 7, the guide track 21 is illustrated with the guide track follower 25 mounted therewithin. The guide track follower 25 includes a mounting ball 54 to receive a socket of the trailer platform 49 mounted at a forward terminal end of the trailer platform 49, with the mounting ball 54 mounted to a ball support carriage 55. A plurality of carriage wheels 56 rotatably mount the carriage for movement within the guide tracks 21 and 23, as well as capturing the carriage within the guide track 21 and the guide track 23, as illustrated in FIG. 1 for example. To maintain geometric integrity of the support structure mounted upon the support bed 12, a right and left respective horizontal support beam 26 and 27 are orthogonally mounted between upper terminal ends of the spaced right and left vertical support posts interconnecting and tying in the right and left horizontal support beams 26 and 27 with the horizontal connecting post 19. This association provides a relatively rigid framework when receiving the boat trailer 49 on the support framework.

Figure 2:
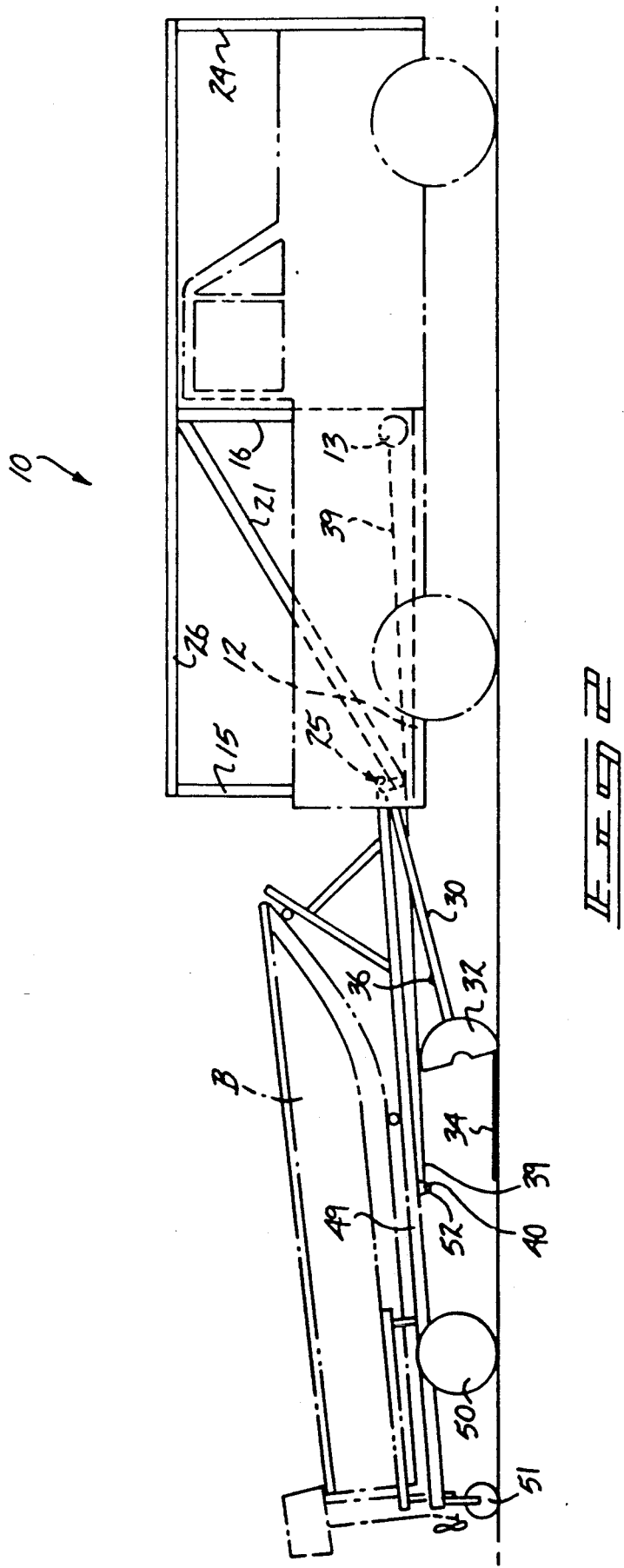
FIG. 2 is an orthographic side view of the invention in a first position to direct a trailer onto the support framework.
Figure 3:
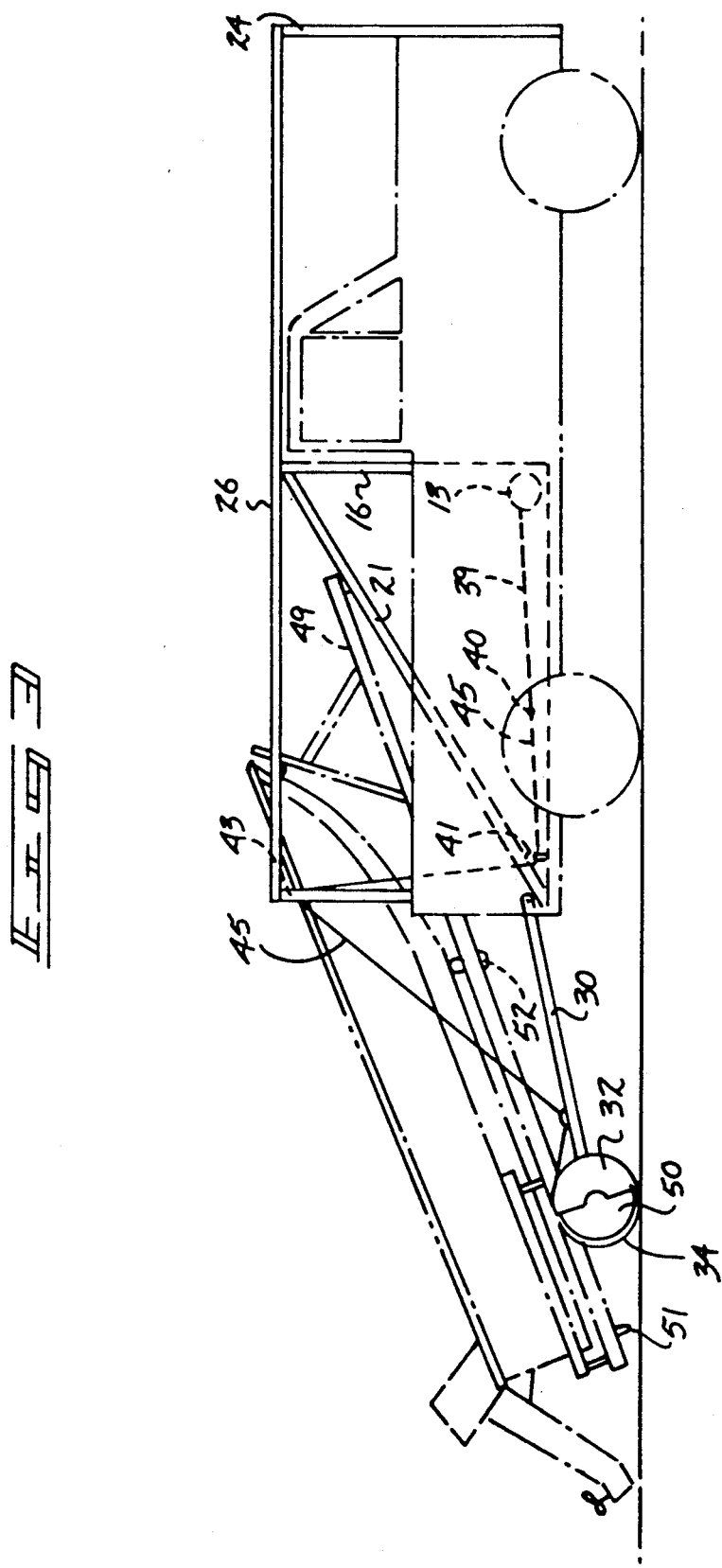
FIG. 3 is an orthographic side view of the invention in a second position.
Figure 4:
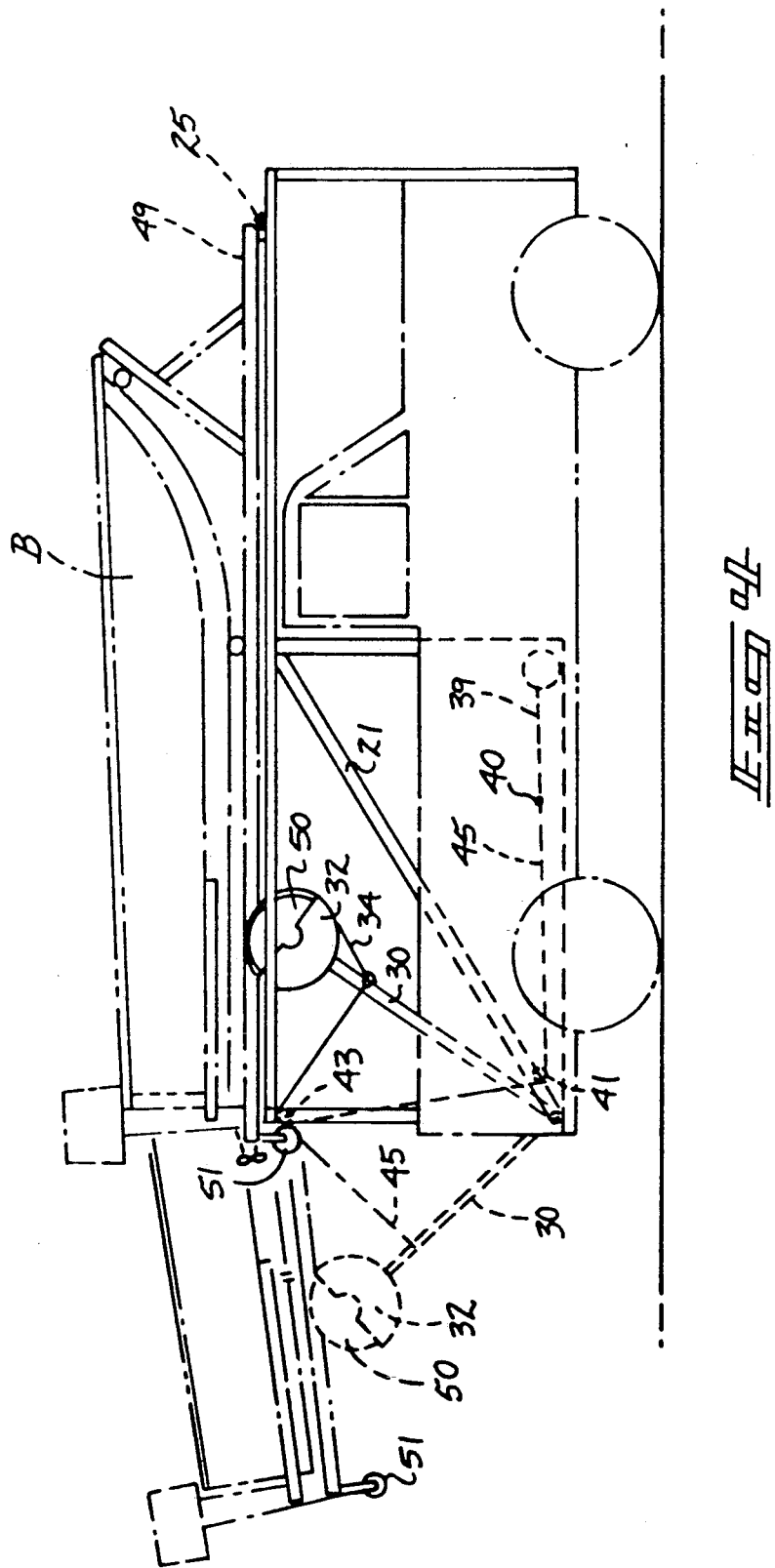
FIG. 4 is an orthographic side view of the invention in a third loaded position.
Figure 9:
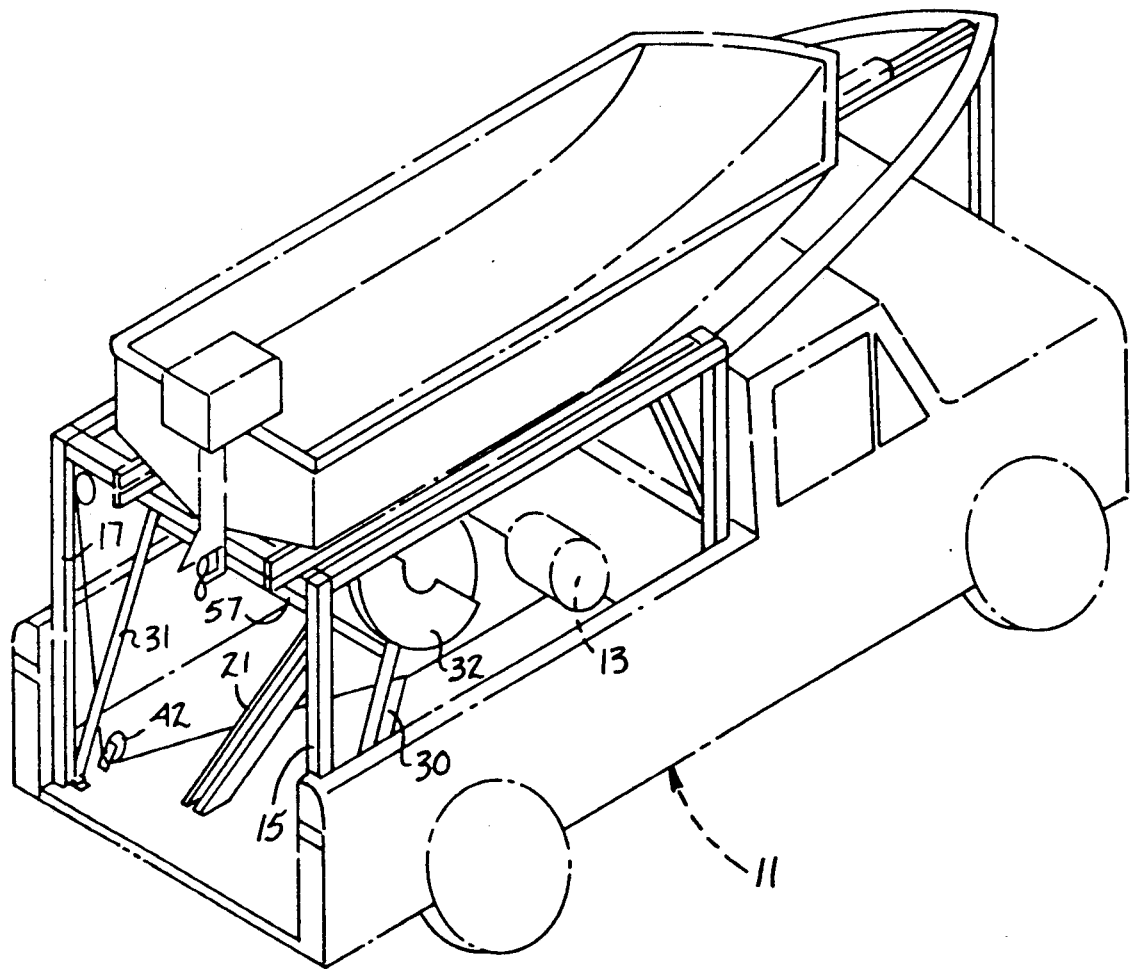
FIG. 9 is an isometric illustration of the trailer in a loaded orientation relative to the support framework.

Respective right and left pivot mounts 28 and 29 are fixedly mounted to the support bed 12 adjacent the rear end portion of the support bed 12, with each respective right and left pivot mount 28 and 29 pivotally mounting a right and left pivot leg 30 and 31 at a lower terminal end of each pivot leg. The pivot legs are of equal length and extend upwardly from the pivot mounts to diagonally bisect a respective right and left semi-cylindrical support cradle 32 and 33 that is fixedly mounted at an upper terminal end of each respective pivot leg 30 and 31. A respective right and left cradle elastomeric strap 34 and 35 is fixedly mounted at one end of the strap to the respective right and left cradle 32 and 33 and is directed about each cradle when a first trailer wheel 50 is positioned within each cradle and subsequently anchored to a respective right and left strap anchor 36 and 37 mounted on the respective right and left pivot legs 30 and 31 adjacent the right and left support cradles 32 and 33. A pivot leg support beam 38 is orthogonally and fixedly mounted between the right and left pivot legs 30 and 31 adjacent the right and left support cradles 32 and 33 to ensure and maintain geometric integrity of the right and left pivot legs 30 and 31 during their pivotment from a lowered orientation, as illustrated in FIG. 2 for example, to a raised orientation, as illustrated in FIG. 4.

The boat trailer platform 49 includes the first trailer wheels 50, as noted above, defined by a first diameter and extending below the platform 50 a first length. Second trailer wheels 51 are mounted to the trailer at a rear end thereof defined by a second diameter less than the first diameter and extending a second length below the trailer platform 49 the second length less than the first length. A platform cable mount 52 is fixedly mounted medially of the bottom of the trailer platform 49 forwardly of the first trailer wheels 50 that are in turn mounted forwardly of the second trailer wheels 51. The winch primary cable 39 is initially in this manner secured to the platform cable mount 52 and pulled up the support framework of the vehicle with the forward terminal end of the support platform 49 mounted on the mounting ball 54 and thereby directed along the first track 21. With the trailer framework at an orientation somewhat below the horizontal connecting post 19, when the second trailer wheels 51 come in contact with the ground surface upon raising or elevating the first trailer wheels 50 above the ground surface, the first trailer wheels 50 are directed into the right and left semi-cylindrical support cradles 32 and 33, with the associated respective right and left cradle elastomeric straps 34 and 35 wound thereabout and secured to the right and left strap anchors 36 and 37. If desired, as illustrated in FIG. 6, an adjusting turn buckle 53 may be mounted between each respective anchor and the associated elastomeric strap to effect tensioning of the elastomeric strap as desired about an included first trailer wheel. Subsequently, with reference to FIG. 8, the primary winch cable 39 that includes a cable hook 40 at its free terminal end, is secured to a pivot leg cable 45. The pivot leg cable 45 is received within the cable hook 40 medially of the pivot leg cable 45, wherein the pivot leg cable 45 is directed along the vehicle support bed 12 towards a respective right and left fixed pulley 41 and 42 fixedly mounted to the vehicle support bed 12 adjacent the respective right and left pivot mounts 28 and 29. Thereafter, the pivot leg cable 45 is directed upwardly along the respective rear vertical support posts 15 and 17 and thereafter directed through respective right and left post pulleys 43 and 44 that are mounted adjacent upper terminal ends of the respective rear vertical support posts 15 and 17. The pivot leg cables right and left free ends thereafter are secured to respective pivot leg cables first and second anchor mounts 47 and 48 that are integrally mounted to the respective right and left pivot legs 30 and 31 adjacent the respective right and left semi-cylindrical support cradles 32 and 33. In this manner, subsequent winching or traction of the primary cable 39 by the winch 13 pivots the legs 30 and 31 to a raised orientation, as illustrated in FIGS. 8 and 4 for example. Subsequently, a rear support bar 57 is positioned between the rear vertical support posts 15 and 17, with pin bores 59 directed through the rear vertical support posts adjacent upper terminal ends to receive support bar pins 58, as illustrated in FIG. 10 for example. In this manner, the rear support bar 57 provides a support rest for a rear portion of the boat trailer platform 49 when mounted to the vehicle's support framework with the boat "B" positioned thereon.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A trailer loading apparatus, comprising,
    a support vehicle, the support vehicle including a vehicle support bed, and
    winch means fixedly mounted to the vehicle support bed at a forward portion thereof, and
    a support framework mounted to the vehicle support bed extending upwardly thereof, the support framework including a first track, wherein the rear end of the first track is mounted adjacent a rear end of the vehicle support bed spaced from the winch assembly, and
    the first track extending forwardly and above the vehicle support bed to an upper portion of the support framework, with a second track in communication and aligned with the first track extending forwardly of the first track to a forward end portion of the vehicle, and
    a guide track follower slidably mounted within the first track and the second track, and including a boat trailer platform, a forward terminal end of the boat trailer platform securable to the guide track follower to direct the boat trailer platform from a first position spaced from the vehicle support bed to a second position oriented above the vehicle support bed, and
    the support framework including a right rear vertical support post and a right front vertical support post mounted orthogonally relative to the vehicle support bed extending upwardly thereof, and a left rear vertical support post and a left front vertical support post spaced from and parallel to the respective right rear vertical support post and the right front vertical support post orthogonally mounted to the vehicle support bed, and a horizontal connecting post orthogonally and integrally mounted to an upper terminal end of the right front vertical support post and the left front vertical support post, the first track extending from the vehicle support bed orthogonally oriented to a medial portion of the horizontal connecting post, and the second track extending from the horizontal connecting post forwardly thereof, and
    the boat trailer platform including a platform cable mount positioned integrally to a bottom medial portion of the boat trailer platform, and the winch assembly including a primary winch cable, the primary winch cable including a cable hook selectively securable to the platform cable mount to direct the boat trailer platform along the first guide track, and
    the boat trailer platform including a plurality of first trailer wheels spaced rearwardly of the platform cable mount and defined by a first diameter extending below the boat trailer platform a first length, and a plurality of second trailer wheels defined by a second diameter less than the first diameter extending below the trailer a second length less than the first length, and the support framework including a right pivot leg and a left pivot leg, the right pivot leg pivotally mounted to the vehicle support bed adjacent the right rear vertical support post, and the left pivot leg pivotally mounted to the vehicle support bed adjacent the left rear vertical support post, and a semi-cylindrical support cradle fixedly mounted to an upper terminal end of each pivot leg for reception of a first trailer wheel of the trailer platform within each support cradle, and each support cradle including an elastomeric strap, each elastomeric strap including a first end mounted to the support cradle and a second end extending about the support cradle to a respective right and left strap anchor mounted to the respective right and left pivot legs.

2. An apparatus as set forth in claim 1 including a right and left fixed pulley mounted to the vehicle support bed adjacent the respective right and left pivot mount, and a respective right and left post pulley mounted to the respective right and left pivot leg adjacent an upper terminal end of each respective right and left pivot leg, and a pivot leg cable directed about the right and left fixed pulleys and the right and left post pulleys, the pivot leg cable including a right and left pivot leg cable end, wherein the right and left pivot cable end is fixedly mounted to a respective right and left pivot leg adjacent the right and left strap anchor, and the cable hook selectively securable medially of the pivot leg cable upon removal of the cable hook from the platform cable mount.

3. An apparatus as set forth in claim 2 wherein the guide track follower includes a mounting ball, the mounting ball extending above the first and second track, and the mounting ball fixedly mounted to an upper terminal end of a ball support carriage, the ball support carriage positioned into each track of the first and second track and including a plurality of carriage wheel means for capturing the ball support carriage within each of said first and second tracks.

4. An apparatus as set forth in claim 3 including a rear support bar removably mounted between the respective right and left rear vertical support posts, with the rear support bar orthogonally mounted between an upper terminal end of each right and left rear vertical support post, and a pin bore directed orthogonally through each right and left rear vertical support post adjacent the respective right and left post pulley, and a right and left support bar pin selectively securable and directed through each respective pin bore of each right and left rear vertical support post received within opposed ends of the rear support bar to secure the rear support bar between the respective right and left rear vertical support post.

* * * * *